US007858883B2

(12) United States Patent
Seraj et al.

(10) Patent No.: US 7,858,883 B2
(45) Date of Patent: Dec. 28, 2010

(54) METHODS AND KITS FOR COVERING ELECTRICAL CABLES AND CONNECTIONS

(75) Inventors: Mahmoud Seraj, Apex, NC (US); Timothy J. McLaughlin, Fuquay-Varina, NC (US); David Brehmer, Ladera Ranch, CA (US); Miguel Contreras, Fuquay-Varina, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 12/572,875

(22) Filed: Oct. 2, 2009

(65) Prior Publication Data

US 2010/0279542 A1  Nov. 4, 2010

Related U.S. Application Data

(60) Provisional application No. 61/174,696, filed on May 1, 2009.

(51) Int. Cl.
*H01R 4/00* (2006.01)
(52) U.S. Cl. .................................................. 174/88 R
(58) Field of Classification Search ............... 174/88 R, 174/150, 85, 73 R; 361/926
See application file for complete search history.

(56) References Cited

U.S. PATENT DOCUMENTS

| | | | |
|---|---|---|---|
| 3,163,707 | A | 12/1964 | Darling |
| 3,475,719 | A | 10/1969 | Akin et al. |
| 3,801,730 | A * | 4/1974 | Nakata et al. ............... 174/73.1 |
| 4,601,529 | A | 7/1986 | Billet |
| 5,233,363 | A | 8/1993 | Yarsunas et al. |
| 5,286,220 | A | 2/1994 | Watson |
| 5,315,063 | A | 5/1994 | Auclair |
| 5,577,926 | A | 11/1996 | Cox |
| 6,364,677 | B1 | 4/2002 | Nysveen et al. |
| 6,520,800 | B1 * | 2/2003 | Michelbach et al. ......... 439/578 |
| 7,072,188 | B2 * | 7/2006 | Janisch ....................... 361/826 |

(Continued)

OTHER PUBLICATIONS

"CSJA In-line Cold Shrinkable Joints for 1/C Shielded Power Cables (15-35kV)" Tyco Electronics, 2006/2007, 2 pages.

(Continued)

*Primary Examiner*—Phuong K Dinh
(74) *Attorney, Agent, or Firm*—Myers Bigel Sibley & Sajovec, PA (57) ABSTRACT

A method for forming a connection assembly includes: forming an electrical connection between first and second electrical cables, the first cable including a first primary conductor and a first neutral conductor, the second cable including a second primary conductor and a second neutral conductor; and providing an integral, unitary cover assembly. The cover assembly includes: an inner elastomeric sleeve defining a cable passage to receive the electrical connection and the first and second primary conductors; and an outer elastomeric sleeve surrounding the inner sleeve. The method further includes: mounting the cover assembly on the cables such that the electrical connection and the first and second primary conductors extend through the cable passage; installing a first protective sleeve on a first neutral segment of the first neutral conductor; routing the first neutral segment and the first protective sleeve exteriorly of the outer sleeve to a second neutral segment of the second neutral conductor; and mechanically and electrically coupling the first and second neutral segments to thereby provide electrical continuity between the first neutral conductor and the second neutral conductor.

20 Claims, 6 Drawing Sheets

U.S. PATENT DOCUMENTS

| | | |
|---|---|---|
| 7,182,617 B1 | 2/2007 | Cairns et al. |
| 7,264,494 B2 | 9/2007 | Kennedy et al. |
| 7,476,114 B1 | 1/2009 | Contreras |
| 2003/0207620 A1* | 11/2003 | Haas et al. ................ 439/669 |
| 2007/0293087 A1 | 12/2007 | Kennedy et al. |
| 2008/0143097 A1 | 6/2008 | Canale |

OTHER PUBLICATIONS

"CSJA Cold Shrinkable 'All-In-One' Straight Joint for Polymeric Insulated Cables Up to 42 kV" Tyco Electronics EPP 1348 7/07, 4 pages.

* cited by examiner

METHODS AND KITS FOR COVERING ELECTRICAL CABLES AND CONNECTIONS

RELATED APPLICATION(S)

The present application claims the benefit of U.S. Provisional Patent Application No. 61/174,696, filed May 1, 2009, the disclosure of which is hereby incorporated herein by reference in its entirety.

FIELD OF THE INVENTION

The present invention relates to electrical cables and connections and, more particularly, to protective covers for electrical cables and electrical connections.

BACKGROUND OF THE INVENTION

Cold shrinkable covers are commonly employed to protect or shield electrical power cables and connections (e.g., low voltage cables up to about 1000 V and medium voltage cables up to about 46 kV). One application for such covers is for splice connections between concentric neutral cables. A concentric neutral cable typically includes at least one primary conductor surrounded by a polymeric insulation layer, a conductive layer, one or more neutral conductors surrounding the conductive layer, and a polymeric jacket surrounding the neutral conductors. Examples of cold shrinkable covers for use with concentric neutral cables include the "All-in-One" CSJA Cold Shrinkable joint, available from Tyco Electronics Corporation of Fuquay-Varina, N.C., which includes an integral neutral conductor mesh. It is also known to cover splices between concentric neutral cables using a cold shrink elastomeric cover tube (such as the CSJ™ product, available from Tyco Electronics Corporation) in combination with a separate re-jacketing cover (such as the GELWRAP™ product, available from Tyco Electronics Corporation). In this case, the cold shrink tube is installed over the primary conductors and the insulation layers, the neutral conductors are laid over the cold shrink tube, and the re-jacketing cover is subsequently wrapped around the neutral conductors and the insulation layer. Each of these known methods may suffer from problems or limitations in performance and/or installation.

SUMMARY OF THE INVENTION

According to embodiments of the present invention, a method for forming a connection assembly includes: forming an electrical connection between first and second electrical cables, the first cable including a first primary conductor and a first neutral conductor, the second cable including a second primary conductor and a second neutral conductor; and providing an integral, unitary cover assembly. The cover assembly includes: an inner elastomeric sleeve defining a cable passage to receive the electrical connection and the first and second primary conductors; and an outer elastomeric sleeve surrounding the inner sleeve. The method further includes: mounting the cover assembly on the cables such that the electrical connection and the first and second primary conductors extend through the cable passage; installing a first protective sleeve on a first neutral segment of the first neutral conductor; routing the first neutral segment and the first protective sleeve exteriorly of the outer sleeve to a second neutral segment of the second neutral conductor; and mechanically and electrically coupling the first and second neutral segments to thereby provide electrical continuity between the first neutral conductor and the second neutral conductor.

According to some embodiments, the method includes: installing a second protective sleeve on the second neutral segment; routing the second neutral segment and the second protective sleeve exteriorly of the outer sleeve; and mechanically and electrically coupling the first and second neutral segments exteriorly of the outer sleeve to thereby provide electrical continuity between the first neutral conductor and the second neutral conductor.

According to some embodiments, the method includes mechanically and electrically coupling the first and second neutral segments exteriorly of the outer sleeve using a neutral connector. The neutral connector can include a shear bolt connector. The method may include positioning an extension portion of the first protective sleeve over the neutral connector and the second protective sleeve. A flowable sealant can be applied to environmentally seal an interface between the first and second protective sleeves.

In some embodiments, the method includes rolling opposed extension sections of the outer sleeve lengthwise beyond the inner sleeve, over portions of the first and second neutral conductors and over portions of the first and second protective sleeves. The extension sections of the outer sleeve may be rolled lengthwise beyond respective opposed ends of the inner sleeve.

The first protective sleeve may be fowled of a flexible polymeric material.

In some embodiments, the method includes mounting the cover assembly on the cables such that the outer sleeve overlaps the first protective sleeve. The method may further include applying a flowable sealant to environmentally seal interfaces between the first protective sleeve, the first cable, and the cover assembly.

According to some embodiments, the outer sleeve is formed of ethylene propylene diene monomer (EPDM) rubber, and the inner sleeve is formed of silicone rubber.

The cover assembly may include at least one of: a Faraday cage sleeve mounted within the inner sleeve and formed of an electrically conductive elastomer; and a stress cone sleeve mounted within the inner sleeve proximate an end thereof, wherein the stress cone sleeve is formed of an electrically conductive elastomer.

In some embodiments, the cover assembly includes a semiconductor layer mounted on an outer side of the inner sleeve and formed of an electrically conductive elastomer.

According to some embodiments, the method includes: maintaining the inner sleeve and the outer sleeve in an expanded state using a removable holdout device mounted within the inner sleeve; mounting the cover assembly on the holdout over the first and second cables and the electrical connection; and thereafter removing the holdout device from the cover assembly to release the inner and outer sleeves to contract onto the first and second cables and the electrical connection.

According to some embodiments, the cover assembly is a cold shrinkable cover assembly.

According to embodiments of the present invention, a kit for covering an electrical connection between first and second electrical cables, the first cable including a first primary conductor and a first neutral conductor, the second cable including a second primary conductor and a second neutral conductor, includes an integral, unitary cover assembly, a first protective sleeve, and a second protective sleeve. The cover assembly includes: an inner elastomeric sleeve defining a cable passage to receive the electrical connection and the first and second primary conductors; and an outer elastomeric sleeve surrounding the inner sleeve. The first protective sleeve is configured to be mounted on the first neutral conductor. The second protective sleeve is configured to be mounted on the second neutral conductor. The first and second protective sleeves are configured to cover neutral segments of the first and second neutral conductors extending exteriorly of the outer sleeve to a connection between the first and second neutral conductors exterior to the outer sleeve.

In some embodiments, the kit includes a neutral connector configured to mechanically and electrically couple the first and second neutral segments exteriorly of the outer sleeve.

According to embodiments of the present invention, a connection assembly includes first and second electrical cables, a cable connector, an integral, unitary cover assembly, and a first protective sleeve. The first cable includes a first primary conductor and a first neutral conductor. The second cable includes a second primary conductor and a second neutral conductor. The cable connector couples the first and second primary conductors to form an electrical connection. The cover assembly includes: an inner elastomeric sleeve defining a cable passage; and an outer elastomeric sleeve surrounding the inner sleeve. The cover assembly is mounted on the cables such that the electrical connection and the first and second primary conductors extend through the cable passage. The first protective sleeve is mounted on a first neutral segment of the first neutral conductor. The first neutral segment and the first protective sleeve are routed exteriorly of the outer sleeve. The first and second neutral segments are mechanically and electrically coupled to thereby provide electrical continuity between the first neutral conductor and the second neutral conductor.

According to some embodiments, the connection assembly includes a second protective sleeve mounted on the second neutral conductor. The second neutral segment and the second protective sleeve are routed exteriorly of the outer sleeve. The first and second neutral segments are mechanically and electrically coupled exteriorly of the outer sleeve to thereby provide electrical continuity between the first neutral conductor and the second neutral conductor.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative teems, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
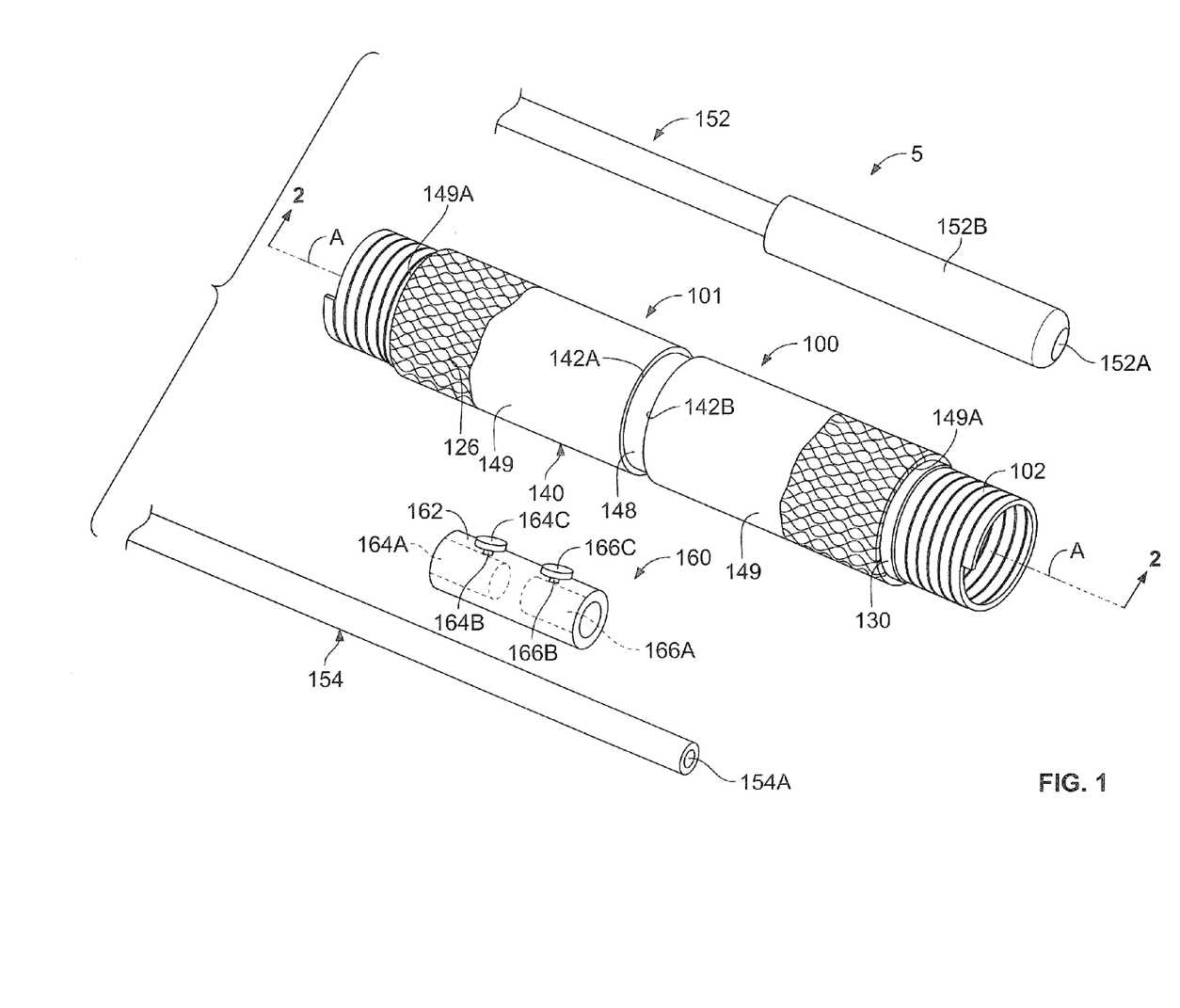
FIG. 1 is a perspective view of a connection covering kit according to some embodiments of the present invention.
Figure 2:
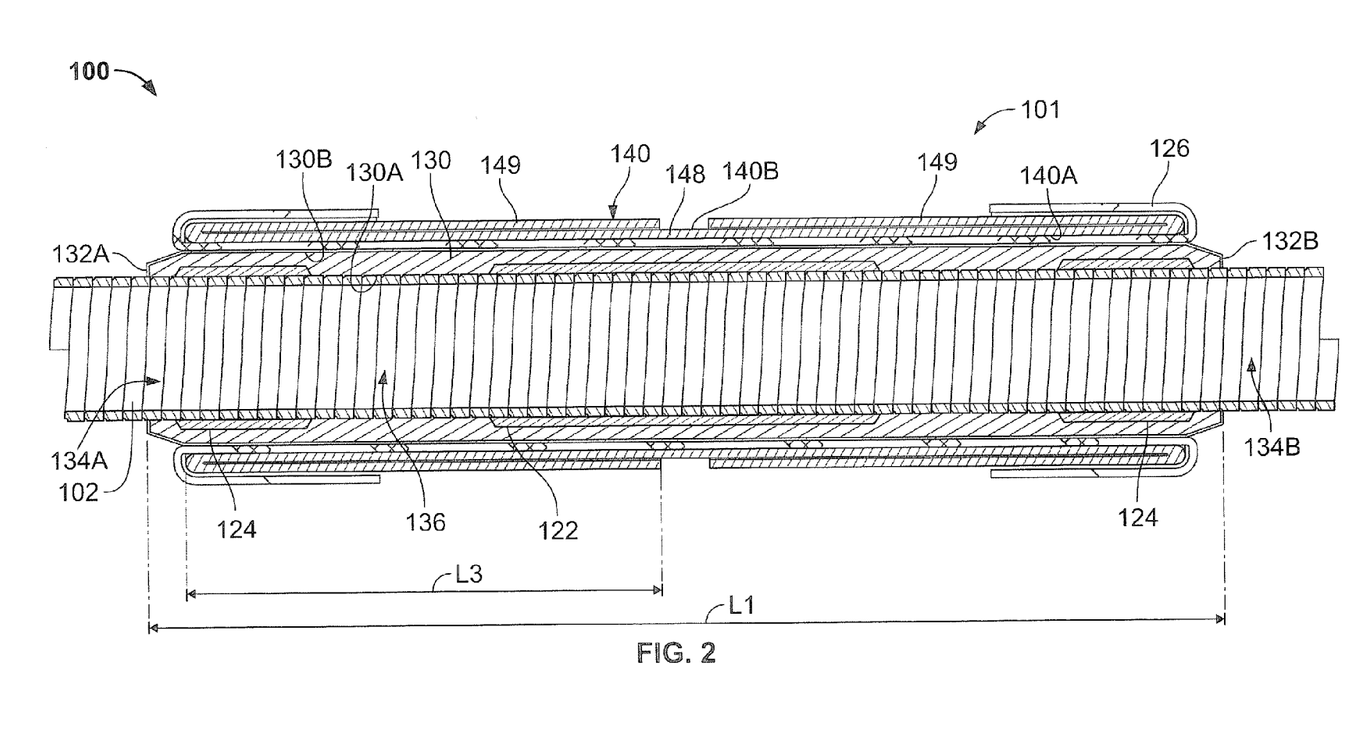
FIG. 2 is a cross-sectional view of a pre-expanded unit including a cover assembly and a holdout device of the connection covering kit of FIG. 1 taken along the line 2-2 of FIG. 1.

With reference to FIGS. 1 and 2, a covering kit 5 according to some embodiments of the present invention is shown therein. The covering kit 5 includes a cover assembly 100, a first neutral protective sleeve 152, a second neutral protective sleeve 154, and a neutral connector 160. The cover assembly 100 may be provided as a pre-expanded unit 101 including a holdout device 102, as shown in FIGS. 1 and 2, wherein the cover assembly 100 is in an expanded state or position.

Figure 8:
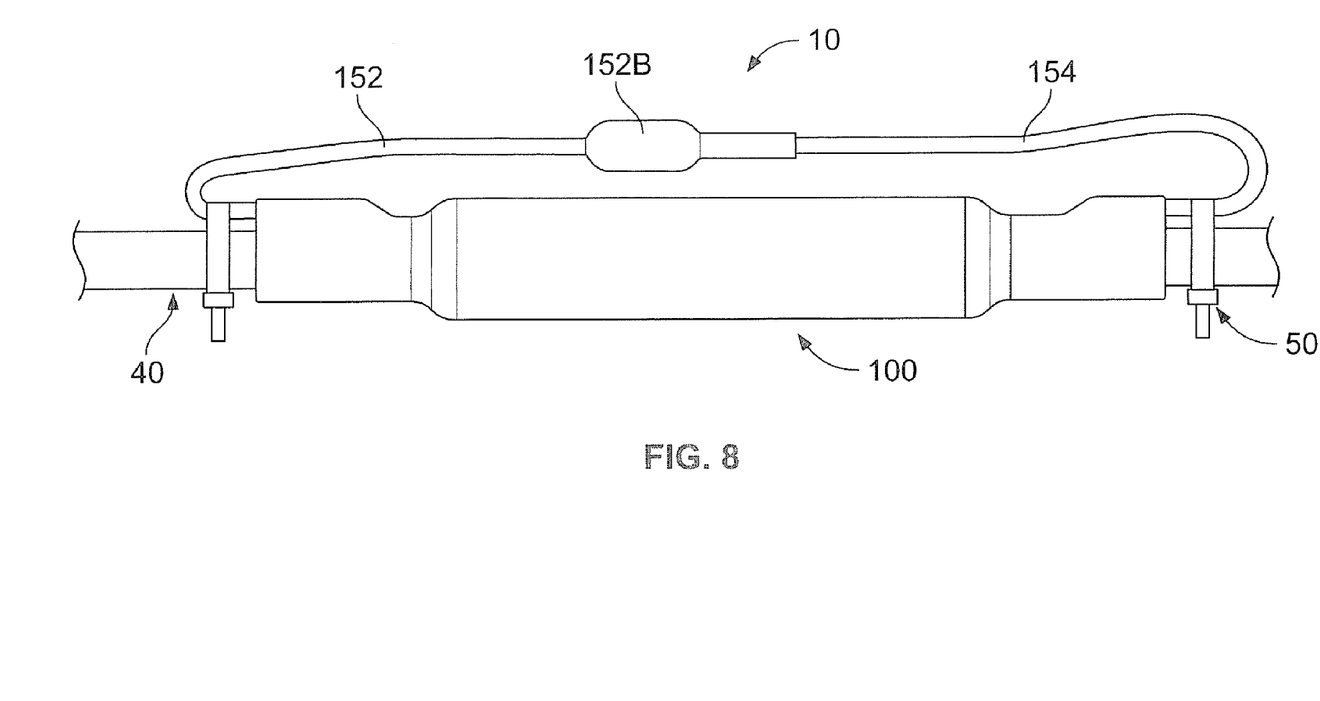

The covering kit 5 may be used to cover and electrically insulate electrical substrates such as cables and connectors. The covering kit 5 may be used to cover and seal a connection or splice between two or more cables 40, 50 including a connector 60 to form a connection assembly 10 as shown in FIG. 8. According to some embodiments, the cables 40, 50 are concentric neutral cables.

The cover assembly 100 may be deployed and mounted on the intended substrate in a retracted state or position as shown in FIG. 8 and discussed in more detail below. According to some embodiments, the cover assembly 100 is a cold shrink cover, meaning that it can be shrunk or retracted about the substrate without requiring the use of applied heat.

The cover assembly 100 includes a Faraday cage layer 122, stress cone layers 124, an inner sleeve (or insulation body) 130, a semiconductor layer 139, an outer sleeve (or re-jacket) 140, and a metal shield mesh layer 126. Referring to FIGS. 1 and 2, the cover assembly 100 has a lengthwise axis A-A. The Faraday cage layer 122, the stress cone layers 124, the inner sleeve 130, the semiconductor layer 139, the outer sleeve 140, and the metal shield mesh layer 126 are provided as an integral, unitary structure extending lengthwise along the axis A-A. According to some embodiments, the cover assembly 100 is provided pre-installed and pre-expanded on the holdout 102.

The inner sleeve 130 has opposed inner and outer surfaces 130A and 130B, and opposed ends 132A, 132B. The inner sleeve 130 is tubular and defines an axially extending conductor through passage 136 that communicates with opposed end openings 134A, 134B.

The Faraday cage layer 122 is illustrated as a generally tubular sleeve bonded to the inner surface 130A of the inner sleeve 130. The Faraday cage layer 122 may be formed of a suitable elastically conductive elastomer. In use, the Faraday cage layer 122 may form a Faraday cage to provide an equal potential volume about the connector 60 so that an electric field is cancelled in the surrounding air voids.

The stress cone layers 124 are illustrated as generally tubular sleeves bonded to the inner surface 130A of the inner sleeve 130 at either end 132A, 132B thereof. The stress cone layers 124 may be formed of a suitable electrically conductive elastomer. In use, the stress cone layers 124 may serve to redistribute the voltage along the surface of the cable insulation 44, 54 to reduce or prevent the degradation of the insulation 44, 54 that might otherwise occur.

According to some embodiments, the layers 122, 124 are formed of a material having a Modulus at 100 percent elongation (M100) in the range of from about 0.68 to 0.88 MPa.

The semiconductor layer 139 fully circumferentially surrounds the inner sleeve 130. According to some embodiments, the semiconductor layer 139 is coextensive with the inner sleeve 130.

The shield mesh layer 126 fully circumferentially surrounds the inner sleeve 130. According to some embodiments, the shield mesh layer 126 includes opposed end sections that extend beyond the ends of the inner sleeve 130 but do not extend as far out as the outer sleeve 140. The shield mesh layer 126 may be formed of braided or woven copper filaments, for example.

Figure 4:
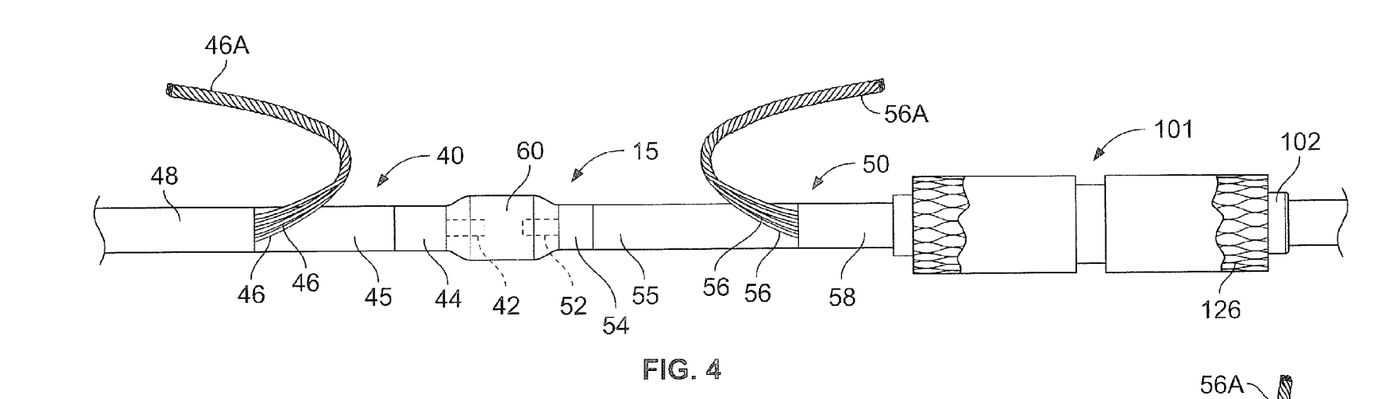
FIGS. 4-8 are side views illustrating procedures for installing the connection covering kit of FIG. 1 on a pair of concentric neutral cables coupled by a connector.

The outer sleeve 140 has opposed inner and outer surfaces 140A and 140B, and opposed ends 142A, 142B. The inner sleeve 140 is tubular and defines an axially extending conductor through passage that communicates with opposed end openings 144A, 144B. When mounted on the holdout 102 as shown in FIGS. 1, 2 and 4, outer sections 149 of the outer sleeve 140 are folded back on an intermediate section 148 of the outer sleeve 140 at annular folds 149A.

The semiconductor layer 139 can be formed of any suitable electrically semiconductive material. According to some embodiments, the semiconductor layer 139 is formed of an elastically expandable material. According to some embodiments, the semiconductor layer 139 is formed of an elastomeric material. According to some embodiments, the semiconductor layer 139 is formed of carbon black and silicone. Other suitable materials may include carbon black and EPDM.

The inner sleeve 130 can be formed of any suitable material. According to some embodiments, the inner sleeve 130 is formed of a dielectric or electrically insulative material. According to some embodiments, the inner sleeve 130 is formed of an elastically expandable material. According to some embodiments, the inner sleeve 130 is formed of an elastomeric material. According to some embodiments, the inner sleeve 130 is formed of liquid silicone rubber (LSR). Other suitable materials may include EPDM or ethylene propylene rubber (EPR). According to some embodiments, the inner sleeve 130 has a Modulus at 100 percent elongation (M100) in the range of from about 0.4 to 0.52 MPa.

According to some embodiments, the thickness of the inner sleeve 130 is in the range from about 0.07 to 2 inches. According to some embodiments, the length L1 (FIG. 2) of the inner sleeve 130 is in the range from about 8 to 30 inches.

The outer sleeve 140 can be formed of any suitable material. According to some embodiments, the outer sleeve 140 is formed of an electrically insulative material. According to some embodiments, the outer sleeve 140 is formed of an elastically expandable material. According to some embodiments, the outer sleeve 140 is formed of an elastomeric material. According to some embodiments, the outer sleeve 140 is formed of ethylene propylene diene monomer (EPDM) rubber. Other suitable materials may include neoprene or other rubber. According to some embodiments, the outer sleeve 140 has a Modulus at 100 percent elongation (M100) in the range of from about 0.6 to 1.1 MPa.

According to some embodiments, the thickness of the outer sleeve 140 is in the range of from about 0.11 to 0.25 inch. According to some embodiments, the length L2 (FIG. 8) of the outer sleeve 140 is in the range of from about 15 to 35 inches. According to some embodiments, the length L3 (FIG. 1) of each outer section 149 of the outer sleeve 140 is in the range of from about 10 to 25 percent greater than the length L2.

The holdout 102 can be formed of any suitable material. According to some embodiments, the holdout 102 is formed of a rigid cardboard or plastic. According to some embodiments, the holdout 102 includes a strip helically wound to form a rigid cylinder as illustrated, for example. The holdout device 102 may be factory installed. In some embodiments, the cover assembly 100 may instead be pre-expanded in the field using a suitable expansion tool.

The cover assembly 100 may be formed by any suitable method and apparatus. According to some embodiments, the inner sleeve 130 is molded and the outer sleeve 140 is thereafter insert overmolded about the inner sleeve 130 with the jumper conductor 152 interposed therebetween.

According to further embodiments, the inner sleeve 130 and the outer sleeve 140 are separately formed (for example, by molding or extrusion) and thereafter the outer sleeve 140 is mounted on the inner sleeve 130.

According to some embodiments, the inner sleeve 130 is unitarily molded. According to some embodiments, the outer sleeve 140 is unitarily molded.

Alternatively, one or more of the inner sleeve 130 and the outer sleeve 140 may be extruded. According to some embodiments, one or both of these components is unitarily extruded.

The first and second neutral protective sleeves 152, 154 are tubular and each define a respective through passage 152A, 154A. The neutral protective sleeve 152 further includes an extension portion 152B that is rolled back onto the main portion thereof. According to some embodiments, the diameters of the through passages 152A, 154A are large enough to permit insertion of the neutral conductor segments 46A, 56A therethrough without undue effort.

The neutral protective sleeves 152, 154 may be formed of any suitable material capable of providing sufficient electrical insulation and abrasion resistance. According to some embodiments, the neutral protective sleeves 152, 154 are flexible. The neutral protective sleeves 152, 154 may be formed of an elastomeric material. According to some embodiments, the neutral protective sleeves 152, 154 are formed of EPDM.

The neutral connector 160 (FIG. 1) may be a connector of any suitable type that can provide mechanical and electrical connections as discussed herein. According to some embodiments and as illustrated, the neutral connector 160 is a shear bolt connector including an electrically conductive (e.g., metal) connector body 162, a first neutral bore 164A, a second neutral bore 166A, a first clamp bolt 164B, a second clamp bolt 166B and bolt heads 164C, 166C. The first bore 164A is configured to receive a segment 46A of the neutral conductors 46 and the bolt 164B is adapted to be screwed down into the neutral bore 166A to clamp the neutral conductor segment 46A in the bore 164A. The second neutral bore 166A is configured to receive a segment 56A of the neutral conductors 56 and the bolt 166B is adapted to be screwed down into the neutral bore 166A to clamp the neutral conductor segment 56A in the bore 166A. The heads 164C, 166C on the bolts 164B, 166B are configured to shear off of a remainder of the associated bolt 164B, 166B (i.e., a threaded shank) when subjected to a prescribed torque. According to some embodiments, the body 162 is formed of copper or aluminum.

Referring now to FIGS. 4-8, the covering kit 5 may be used in the following manner to apply the cover 100 and neutral protective sleeves 152, 154 over a splice connection 15 (FIG. 4) between a pair of electrical power transmission cables 40, 50 to form a connection assembly 10. According to some embodiments, the cables 40, 50 are low-voltage or medium-voltage (e.g., between about 5 and 46 kV) power transmission cables.

Figure 3:
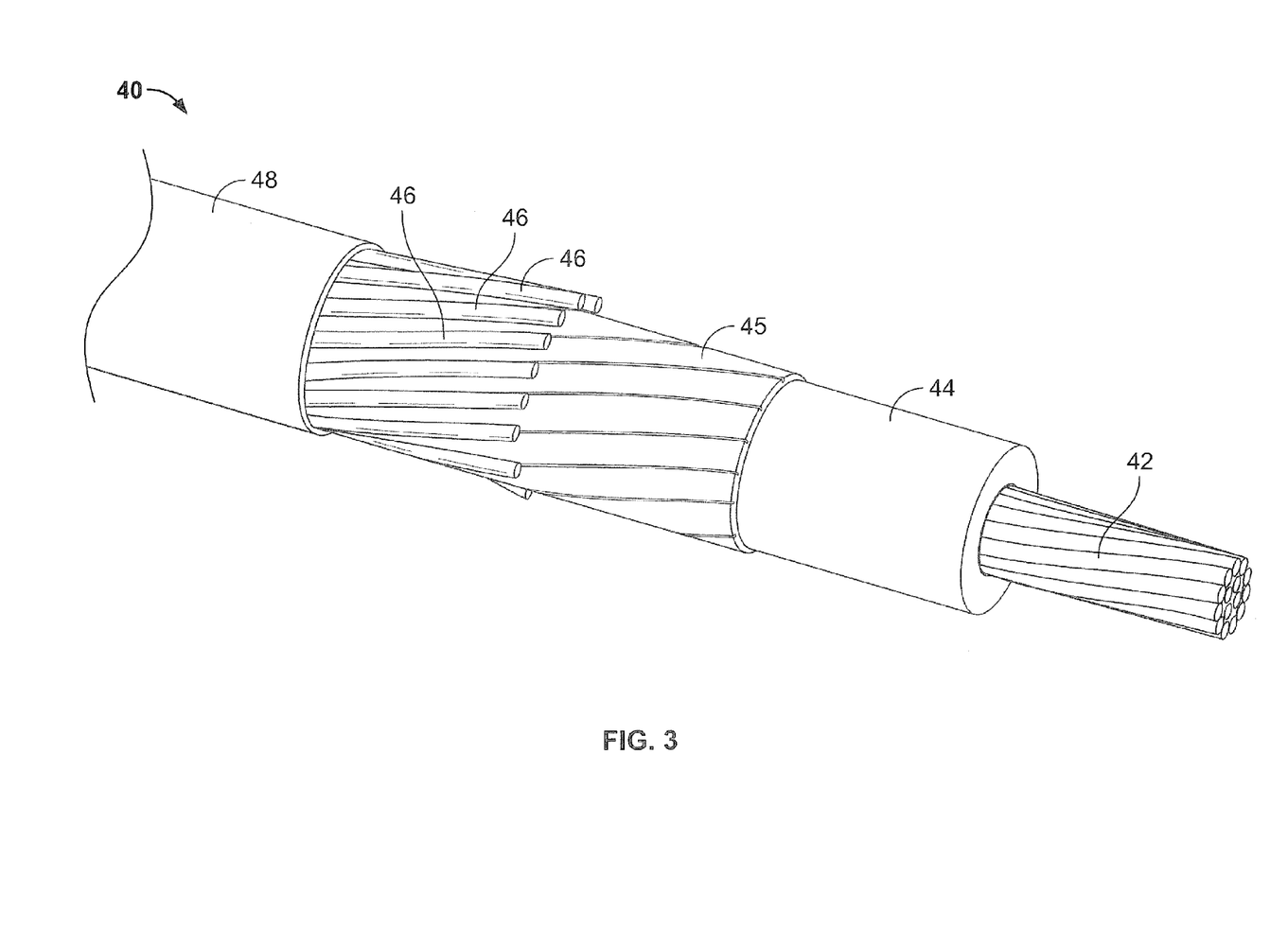
FIG. 3 is a perspective view of an exemplary concentric neutral cable.

As shown in FIG. 3, the cable 40 includes a primary electrical conductor 42, a polymeric insulation layer 44, a semiconductor layer 45, one or more neutral conductors 46, and a jacket 48, with each component being concentrically surrounded by the next. According to some embodiments and as shown, the neutral conductors 46 are individual wires, which may be helically wound about the semiconductor layer 45. The primary conductor 42 may be formed of any suitable electrically conductive materials such as copper (solid or stranded). The polymeric insulation layer 44 may be formed of any suitable electrically insulative material such as crosslinked polyethylene (XLPE) or EPR. The semiconductor layer 45 may be formed of any suitable semiconductor material such as carbon black with silicone. The neutral conductors 46 may be formed of any suitable material such as copper. The jacket 48 may be formed of any suitable material such as EPDM. The cable 50 is similarly constructed with a primary electrical conductor 52, a polymeric insulation layer 54, a semiconductor layer 55, one or more neutral conductors 56, and a jacket 58 corresponding to components 42, 44, 45, 46 and 48, respectively.

The connection assembly 10 may be formed and the covering kit 5 may be installed as follows. The cables 40, 50 are prepared as shown in FIG. 4 such that a segment of each layer extends beyond the next overlying layer. A neutral conductor segment 46A of the neutral conductors 46 extends at least a prescribed distance beyond the end of the jacket 48. Similarly, a neutral conductor segment 56A of the neutral conductors 56 extends at least a prescribed distance beyond the end of the jacket 58. The excess lengths of the conductor segments 46A, 56A are twisted to form respective neutral conductor bundles. The segments 46A, 56A can be folded back as shown in FIG. 4.

The pre-expanded unit 101 is slid over the cable 50 as shown in FIG. 4. According to some embodiments, the inside diameter of the holdout 102 is greater than the outer diameter of each cable 40, 50 such that the inner diameter of the holdout 102 is sufficient to receive the prepared cable 40, 50 and the connector 60 without undue effort. According to some embodiments, the inner diameter of the holdout 102 is at least as great as the outer diameter of the largest portion of the cables or connectors that are to be received in the passage 136. The pre-expanded unit 101 may be retained or parked on the cable 50 until the operator is ready to install the cover assembly 100 on the cables 40, 50.

Figure 6:
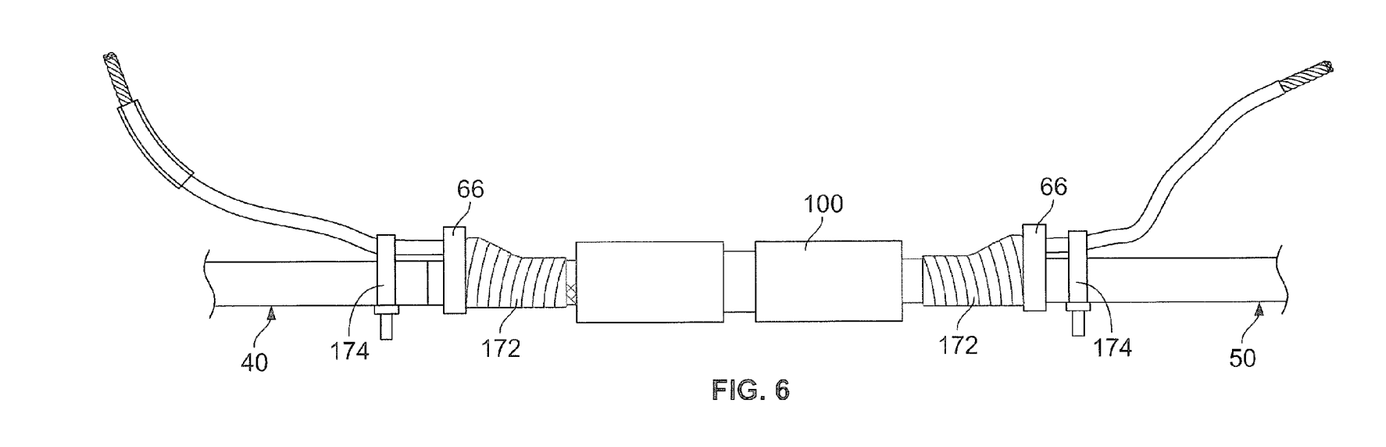
Figure 7:
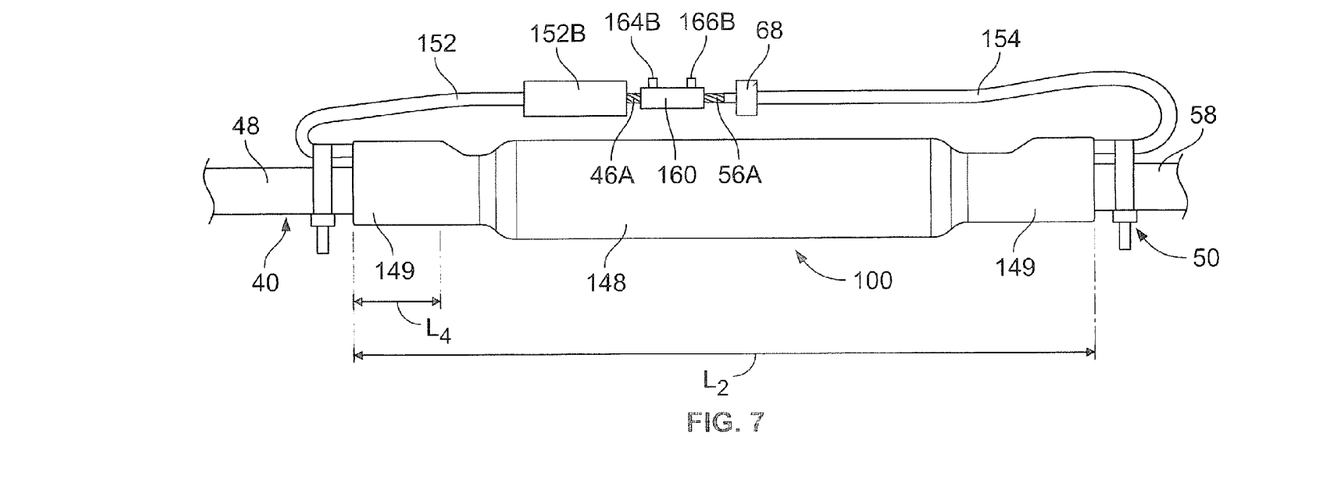

The electrical connector 60 is secured to each primary conductor 42, 52 to mechanically and electrically couple the primary conductors 42, 52 to one another as shown in FIG. 6. The connector 60 may be any suitable type of connector such as a metal crimp connector.

Figure 5:
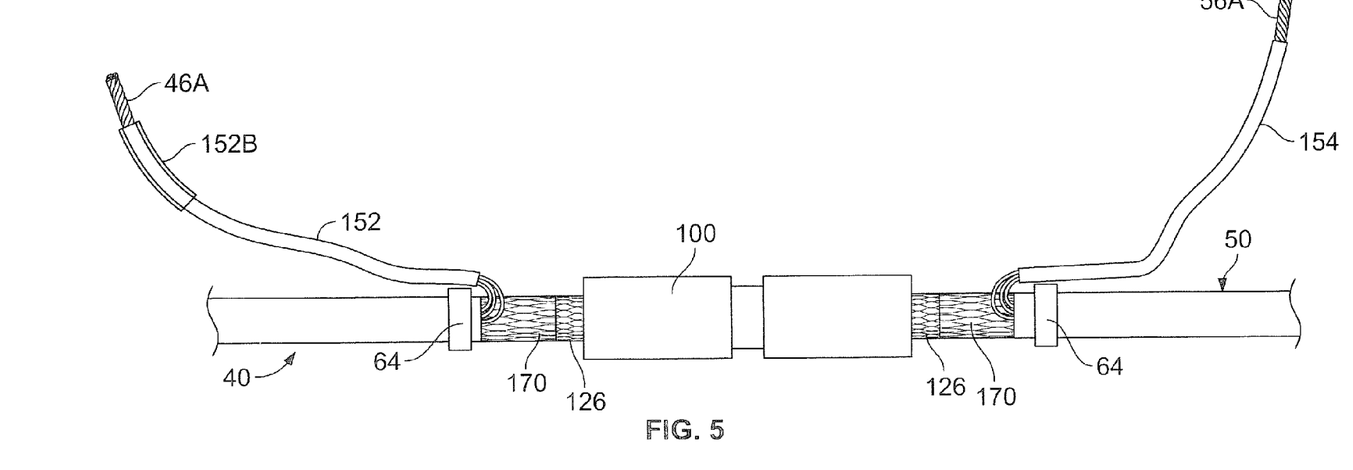

The pre-expanded unit 101 is then slid into position over the connector 60. The holdout 102 is then removed from the cover assembly 100, thereby permitting the elastomeric sleeves 130, 140 to relax and radially retract about the cables 40, 50 and the connector 60 as shown in FIG. 5. According to some embodiments, the inner sleeve 130 overlaps and engages the semiconductor layers 44, 54 of the cables 40, 50.

The shield mesh 126 is rolled outwardly onto the semiconductor layers 45, 55 as shown in FIG. 5. A metal mesh web 170 can be wrapped about each cable 40, 50 as also shown in FIG. 5 to secure the end edges of the shield mesh 126. The metal mesh web 170 may be wrapped about exposed ends of the neutral conductors 46, 56 to electrically connect the shield mesh 126 to the neutral conductors 46, 56.

The neutral protective sleeve 152 is slid over and onto the neutral conductor segment 46A as shown in FIG. 5. Similarly, the neutral protective sleeve 154 is slid over and onto the neutral segment 56A as shown in FIG. 5. The neutral protective sleeves 152, 154 are sized or trimmed such that a short length of the free end of each neutral conductor segment 46A, 56A remains exposed beyond the neutral protective sleeve 152, 154 mounted thereon.

Strips of flowable sealant 64 (FIG. 5) are applied to the outer surfaces of the cable jackets 48, 58 and under the neutral protective sleeves 152, 154. According to some embodiments, the sealant 64 is a mastic.

Retainers 174 may be installed about the cables 40, 50 and the neutral protective sleeves 152, 154 to hold the neutral conductor segments 46A, 56A in place as shown in FIG. 6. The retainers 174 may be zip ties or tape, for example.

Strips of flowable sealant 66 (FIG. 6) are applied to the outer surfaces of the cable jackets 48, 58 and over the neutral protective sleeves 152, 154. According to some embodiments, the sealant 66 is a mastic.

Tape 172 (e.g., a vinyl tape) can thereafter be wrapped around the cables 40, 50, the exposed neutral conductor segments 46A, 56A, and the exposed ends of the neutral protective sleeves 152, 154 as shown in FIG. 6.

The operator then rolls each of the extension sections 149 of the outer sleeve 140 axially outwardly to cover the adjacent sections of the cables 40 and 50, respectively. According to some embodiments, at least a portion of each extension section 149 overlaps a respective portion of each cable jacket 48, 58 and engages the associated sealant strip 64 to provide a moisture seal. Each extension section 149 also overlaps a respective one of the neutral protective sleeves 152, 154. According to some embodiments, the length of overlap L4

(FIG. 7) between each extension section 149 and the underlying neutral protective sleeve 152, 154 is at least 2 inches.

The relaxed inner diameter of the outer sleeve 140 is less than at least the outer diameter of the jacket layers 48, 58. Therefore, the outer sleeve 140 exerts a radially inwardly compressive or clamping force or pressure (due to elastic tension) onto the cables 40, 50 and the neutral protective sleeves 152, 154. The outer sleeve 140 thereby effects a liquid tight seal at the interface between the cable jackets 48, 58, the neutral protective sleeves 152, 154 and the outer sleeve 140. This seal can protect the cable and the splice from the ingress of environmental moisture. According to some embodiments the relaxed inner diameter of the inner sleeve 130 is at least 10% less than the smallest diameter cable upon which the cover assembly 100 is intended to be installed.

The free end of the neutral conductor segment 46A is inserted in the bore 164A of the connector 160 and clamped therein by driving the associated shear bolt 164B until the head 164C shears off. Similarly, the free end of the neutral conductor segment 56A is inserted in the bore 166A of the connector 160 and clamped therein by driving the associated shear bolt 166B until the head 166C shears off. In this manner, the neutral conductor segments 46A, 56A are electrically and mechanically coupled to one another and the shield mesh 126.

A strip of flowable sealant 68 (FIG. 7) is applied to the outer surface of the neutral protective sleeve 154. According to some embodiments, the sealant 68 is a mastic.

The extension portion 152C of the neutral protective sleeve 152 is then rolled forward over the connector 160 and onto the neutral protective sleeve 154 such that it engages the sealant strip 68 to form an environmental seal.

The covering kit 5 is thereby fully installed to form the connection assembly 10 as shown in FIG. 8.

Covering kits and methods of the present invention and as described herein can provide a number of advantages. The cover assembly 100 provides an "all-in-one" integral unit that can be installed in similar fashion to known cold shrink splice cover insulating tubes and the neutral protective sleeves 152, 154 and the neutral connector 160 accommodates the neutral conductors of concentric neutral cables in a complementary manner. The cover assembly 100 including the inner sleeve 130, the outer sleeve 140, and the shield mesh 126 can be preassembled at a factory. Because continuity is provided between the neutral conductors 46, 56 via the coupling at the neutral connector 160, it is not necessary to provide and install a separate and supplemental re-jacketing cover around the connection 15 to cover the neutral conductors (which must be electrically insulated from the primary conductors 42, 52 and the primary connector 60).

The cover assembly 100 can also provide advantages over known "all-in-one" integral units of the type wherein an electrically conductive mesh is incorporated into the cover assembly to engage and provide continuity between the neutral conductors (typically, copper tapes) of the concentric neutral cables. In particular, in the case of these known cover assemblies, the electrically conductive mesh may not be sufficiently conductive to provide the amount of continuity desired or required. For example, the neutral conductors of the cables being spliced may have a greater combined gauge than that of the connecting mesh. By directly coupling the original neutral conductors of the cables 40, 50, the cover assembly 100 can ensure that the neutral conductors provided across the cover assembly 100 and the splice connection 15 are of the proper gauge. In this way, adequate continuity between the cables 40, 50 can be ensured.

More generally, the cover assemblies and methods of the present invention can provide improvements in ease of installation.

While in the embodiments shown in the drawings the neutral conductors are wires, according to further embodiments the neutral conductors may take other shapes or configurations such as one or more flat tapes.

According to some embodiments, an electrical connector of a different type may be used in place of the shear bolt connector 160. For example, a crimp connector may be used to couple the neutral conductor segments 46A, 56A.

Cover assemblies according to some embodiments of the present invention may include additional layers and/or certain layers may be omitted. For example, cover assemblies in accordance with some embodiments of the present invention may be formed without the semiconductor layer 139 or the shield mesh 126. One or more additional layers may be interposed between the inner sleeve 130 and the outer sleeve 140.

Cover assemblies according to embodiments of the invention may be used for any suitable cables and connections. Such cable assemblies may be adapted for use, for example, with connections of medium voltage cables up to about 46 kV.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A method for forming a connection assembly, the method comprising:
    forming an electrical connection between first and second electrical cables, the first cable including a first primary conductor and a first neutral conductor, the second cable including a second primary conductor and a second neutral conductor;
    providing an integral, unitary cover assembly including:
        an inner elastomeric sleeve defining a cable passage to receive the electrical connection and the first and second primary conductors; and
        an outer elastomeric sleeve surrounding the inner sleeve;
    mounting the cover assembly on the cables such that the electrical connection and the first and second primary conductors extend through the cable passage;
    installing a first protective sleeve on a first neutral segment of the first neutral conductor;
    routing the first neutral segment and the first protective sleeve exteriorly of the outer sleeve to a second neutral segment of the second neutral conductor; and
    mechanically and electrically coupling the first and second neutral segments to thereby provide electrical continuity between the first neutral conductor and the second neutral conductor.

2. The method of claim 1 including:
    installing a second protective sleeve on the second neutral segment;
    routing the second neutral segment and the second protective sleeve exteriorly of the outer sleeve; and mechanically and electrically coupling the first and second neutral segments exteriorly of the outer sleeve to thereby provide electrical continuity between the first neutral conductor and the second neutral conductor.

3. The method of claim 2 including mechanically and electrically coupling the first and second neutral segments exteriorly of the outer sleeve using a neutral connector.

4. The method of claim 3 wherein the neutral connector includes a shear bolt connector.

5. The method of claim 3 including positioning an extension portion of the first protective sleeve over the neutral connector and the second protective sleeve.

6. The method of claim 5 including applying a flowable sealant to environmentally seal an interface between the first and second protective sleeves.

7. The method of claim 2 including rolling opposed extension sections of the outer sleeve lengthwise beyond the inner sleeve, over portions of the first and second neutral conductors and over portions of the first and second protective sleeves.

8. The method of claim 7 including rolling the extension sections of the outer sleeve lengthwise beyond respective opposed ends of the inner sleeve.

9. The method of claim 1 wherein the first protective sleeve is formed of a flexible polymeric material.

10. The method of claim 1 including mounting the cover assembly on the cables such that the outer sleeve overlaps the first protective sleeve.

11. The method of claim 10 including applying flowable sealant to environmentally seal interfaces between the first protective sleeve, the first cable, and the cover assembly.

12. The method of claim 1 wherein:
the outer sleeve is formed of ethylene propylene diene monomer (EPDM) rubber; and
the inner sleeve is formed of silicone rubber.

13. The method of claim 1 wherein the cover assembly includes at least one of:
a Faraday cage sleeve mounted within the inner sleeve and formed of an electrically conductive elastomer; and
a stress cone sleeve mounted within the inner sleeve proximate an end thereof, wherein the stress cone sleeve is formed of an electrically conductive elastomer.

14. The method of claim 1 wherein the cover assembly includes a semiconductor layer mounted on an outer side of the inner sleeve and formed of an electrically conductive elastomer.

15. The method of claim 1 including:
maintaining the inner sleeve and the outer sleeve in an expanded state using a removable holdout device mounted within the inner sleeve;
mounting the cover assembly on the holdout over the first and second cables and the electrical connection; and thereafter
removing the holdout device from the cover assembly to release the inner and outer sleeves to contract onto the first and second cables and the electrical connection.

16. The method of claim 1 wherein the cover assembly is a cold shrinkable cover assembly.

17. A kit for covering an electrical connection between first and second electrical cables, the first cable including a first primary conductor and a first neutral conductor, the second cable including a second primary conductor and a second neutral conductor, the kit comprising:
an integral, unitary cover assembly including:
an inner elastomeric sleeve defining a cable passage to receive the electrical connection and the first and second primary conductors; and
an outer elastomeric sleeve surrounding the inner sleeve;
a first protective sleeve configured to be mounted on the first neutral conductor; and
a second protective sleeve configured to be mounted on the second neutral conductor;
wherein the first and second protective sleeves are configured to cover neutral segments of the first and second neutral conductors extending exteriorly of the outer sleeve to a connection between the first and second neutral conductors exterior to the outer sleeve.

18. The kit of claim 17 including a neutral connector configured to mechanically and electrically couple the first and second neutral segments exteriorly of the outer sleeve.

19. A connection assembly comprising:
first and second electrical cables, the first cable including a first primary conductor and a first neutral conductor, the second cable including a second primary conductor and a second neutral conductor;
a cable connector coupling the first and second primary conductors to form an electrical connection;
an integral, unitary cover assembly including:
an inner elastomeric sleeve defining a cable passage;
an outer elastomeric sleeve surrounding the inner sleeve;
wherein the cover assembly is mounted on the cables such that the electrical connection and the first and second primary conductors extend through the cable passage; and
a first protective sleeve mounted on a first neutral segment of the first neutral conductor;
wherein:
the first neutral segment and the first protective sleeve are routed exteriorly of the outer sleeve; and
the first and second neutral segments are mechanically and electrically coupled to thereby provide electrical continuity between the first neutral conductor and the second neutral conductor.

20. The connection assembly of claim 19 including a second protective sleeve mounted on the second neutral conductor, wherein:
the second neutral segment and the second protective sleeve are routed exteriorly of the outer sleeve; and
the first and second neutral segments are mechanically and electrically coupled exteriorly of the outer sleeve to thereby provide electrical continuity between the first neutral conductor and the second neutral conductor.

* * * * *